(12) United States Patent
Dahl et al.

(10) Patent No.: US 10,331,166 B2
(45) Date of Patent: *Jun. 25, 2019

(54) USER INTERFACES

(75) Inventors: Tobias Dahl, Oslo (NO); Hans Jørgen Bang, Oslo (NO)

(73) Assignee: ELLIPTIC LABORATORIES AS, Oslo (NO)

( * ) Notice: Subject to any disclaimer, the term of this patent is extended or adjusted under 35 U.S.C. 154(b) by 1111 days.

This patent is subject to a terminal disclaimer.

(21) Appl. No.: 13/500,892

(22) PCT Filed: Oct. 7, 2010

(86) PCT No.: PCT/GB2010/051683
§ 371 (c)(1),
(2), (4) Date: Jul. 2, 2012

(87) PCT Pub. No.: WO2011/042748
PCT Pub. Date: Apr. 14, 2011

(65) Prior Publication Data
US 2013/0050080 A1  Feb. 28, 2013

(30) Foreign Application Priority Data

Oct. 7, 2009 (GB) .................................... 0917526.6
Mar. 17, 2010 (GB) .................................... 1004438.6
May 20, 2010 (GB) .................................... 1008399.6

(51) Int. Cl.
*G01S 5/18* (2006.01)
*G01S 5/30* (2006.01)
(Continued)

(52) U.S. Cl.
CPC .............. *G06F 1/1626* (2013.01); *G01S 5/18* (2013.01); *G01S 5/30* (2013.01); *G06F 3/017* (2013.01);
(Continued)

(58) Field of Classification Search
None
See application file for complete search history.

(56) References Cited

U.S. PATENT DOCUMENTS 7,036,094 B1 * 4/2006 Cohen ............... G06K 9/00348
715/863
8,219,028 B1 * 7/2012 Flamholz ............ H04M 1/7253
455/41.2
(Continued)

FOREIGN PATENT DOCUMENTS

WO      WO 02/45273 A2      6/2002
WO   WO 2004/0745169 A2    9/2004
(Continued)

OTHER PUBLICATIONS

International Search Report for International application No. PCT/GB2010/051683 dated Oct. 11, 2011 by European Patent Office.
Official Action dated Aug. 31, 2015.

*Primary Examiner* — Amr A Awad
*Assistant Examiner* — Maheen I Javed
(74) *Attorney, Agent, or Firm* — Beyer Law Group LLP

(57) ABSTRACT

A system includes first and second handheld devices. The first device transmits an acoustic signal, and the acoustic signal is reflected from an input object. The second device receives a received signal derived from a reflection of the acoustic signal from the input object. The second device determines information about the location or motion of the input object based on the received signal, and thereby detects a gesture performed by the input object.

41 Claims, 4 Drawing Sheets

(51) Int. Cl.
*G06F 1/16* (2006.01)
*G06F 3/01* (2006.01)
*H04M 1/725* (2006.01)
*G06F 3/0486* (2013.01)
*G06F 3/0488* (2013.01)

(52) U.S. Cl.
CPC .......... *G06F 3/0486* (2013.01); *G06F 3/0488* (2013.01); *H04M 1/7253* (2013.01); *H04M 2250/12* (2013.01)

(56) References Cited

U.S. PATENT DOCUMENTS

| | | | |
|---|---|---|---|
| 2003/0195723 A1* | 10/2003 | Bensky | G01S 13/84 702/189 |
| 2006/0161871 A1 | 7/2006 | Hotelling et al. | |
| 2006/0233045 A1* | 10/2006 | Fluhler | G01S 13/888 367/11 |
| 2007/0109527 A1* | 5/2007 | Wenstrand | 356/3.1 |
| 2007/0211023 A1* | 9/2007 | Boillot | G06F 3/017 345/156 |
| 2008/0100572 A1 | 5/2008 | Boillot | |
| 2009/0199641 A1* | 8/2009 | Bhardwaj | G01H 5/00 73/597 |
| 2009/0233551 A1* | 9/2009 | Haartsen et al. | 455/41.3 |
| 2010/0019972 A1* | 1/2010 | Evans | G06F 3/041 342/450 |
| 2010/0083189 A1* | 4/2010 | Arlein et al. | 715/863 |
| 2010/0090970 A1* | 4/2010 | Lin | G06F 1/1609 345/173 |
| 2010/0297946 A1* | 11/2010 | Alameh | H04M 1/7253 455/41.3 |

FOREIGN PATENT DOCUMENTS

WO  WO 2009/112901 A1  9/2009
WO  WO 2009/147398     12/2009

* cited by examiner

USER INTERFACES

RELATED APPLICATIONS

This application is the National Stage of International Application No. PCT/GB2010/051683, filed Oct. 7, 2010, which claims the benefit of GB 0917526.6, filed Oct. 7, 2009, GB 1004438.6, filed Mar. 17, 2010, and GB 1008399.6, filed May 20, 2010. Each of these applications is hereby expressly incorporated by reference in its entirety herein.

This invention relates to user interfaces for electronic devices. It relates particularly to interfaces involving more than one device.

It is known to track an object for touchless interaction with a computing device with an ultrasonic transmitter and a number of receivers using time-of-flight measurements. Indeed various proposals for such tracking have been made—e.g. in US patent application U.S. 2006/0161871 by Apple, which relates particularly to input to a handheld device by a user's finger. However these proposals have shortcomings. In particular, they can be sensitive to interference from echoes caused by other objects and from active sources of noise.

Optical tracking based on time-of-flight principles has also been attempted; however, the technology is complex and costly, due in part to the need for optical components and the very high clock-speeds required. Furthermore, it is impossible to flush-mount a camera having a wide (e.g. 180-degree) field of view, meaning that camera lenses must partly project from the surface of the device so that they are exposed to damage and contamination, as well as being potentially less aesthetically-pleasing.

Interference is particularly problematic in acoustic tracking systems, compared with optical ones, due to the wider dispersion characteristics and much lower speed of sound waves.

The inventor has recognised a particular problem when two or more devices, especially mobile devices, attempt to use acoustic input systems within audible range of each other. They are likely to interfere with each other, especially when they are configured to transmit similar or identical acoustic signals to each other (e.g. in the same frequency range). However it has also been realised that having multiple devices in the vicinity of one another opens up many exciting possibilities for new ways in which they can interact.

When viewed from a first aspect the invention provides a method of operating a system comprising first and second handheld devices comprising the steps of:

said first device transmitting an acoustic signal;
said second device receiving a received signal derived from said acoustic signal; and
said second device performing an action based on said received signal.

This aspect extends to a handheld device configured to:
receive a received signal derived from an acoustic signal transmitted by another handheld device; and
perform an action based on said received signal.

Thus it will be seen by those skilled in the art that in accordance with the invention two devices can interact by one of the devices receiving and acting on an acoustic signal from the other. There are possible ways in which such functionality might be exploited. One simplistic example might be for the second device to alert a user to the presence of another user (of the first device) in the vicinity—e.g. any user or any that can be identified—or any with an identity in the second device's phonebook.

In a set of possible embodiments said second device determines information about the location or motion of the first device. There are many situations in which this knowledge could be exploited by the second device. One example would be where the first device is used effectively as an active input device for the other. Many different types of input are possible ranging from the first device being able to activate or terminate a function to controlling a cursor or other selector on the second device. One situation where it is envisaged that this could be beneficial is where the first device is a mobile device such as a smartphone and the second device is a portable laptop where the 'phone can act as a mouse or remote control/selector thereby obviating the need to carry a dedicated piece of equipment for that purpose. Another, more simplistic application would be to plot the position or proximity or movement of the user of the first device on a display of the second device—e.g. for the purposes of a game or to enhance or encourage social interaction.

In a set of embodiments said second device determines the distance between the first and second devices. This could take the form of a simple determination as to whether the first device is in a given distance range, or it could be a more detailed measurement of their separation distance. This could be used for many different purposes. For example it could be used to apply a threshold proximity for determining whether to activate a function involving the two devices, or to provide an alert to the second user of the proximity of the first. Such a distance determination could be carried out, for example, by measuring the signal strength of the received signal, or by measuring the time of flight—e.g. relative to a synchronisation or reference signal. Such a reference signal could be provided externally—e.g. by the cellular radio network in the case of a smartphone—or from the first device. If provided from the first device it is preferably in the form of an electromagnetic signal. Thus in a set of embodiments said first device transmits a further, electromagnetic signal to the second device. This could be for example a radio or infra-red signal.

In a set of embodiments the second device determines whether the first device is in a predetermined angular range. This could be used, for example, for determining which sector of a room the first device is in which might have some application in e.g. playing a game involving the first and second devices where players are in angular sectors and angles are determined using beamforming. The angle information can also help in determining the actual location of the first device—e.g. in conjunction with the determination of range discussed above.

More generally in a set of preferred embodiments the second device determines location information relating to the first device from the received acoustic signal. In a set of such embodiment the second device receives the received acoustic signal via a plurality of receivers. One way of achieving this is to measure the time difference of arrival of said signal at the receivers. With a sufficient number of receivers this can be used on its own to obtain a fix on the location of the first device. Of course the same result can be achieved with multiple transmitters on the first device and a single receiver on the second device. Additionally or alternatively the distance determination discussed could be used to help fix the location. Having the second device fix the location of the first permits, for example, the movement of the first device to be tracked so that it can be used as an input device for the second as mentioned above.

In one particular set of embodiments in which the second device determines information about the location or motion of the first device, said motion comprises a shaking or spinning. Such motion of the first device can be detected relatively easily by detecting specific patterns in the acoustic signal received by the second device. This function could be used, for example, to implement a feature whereby a user can stimulate an action, e.g. an alert or 'wake-up' from a standby state, in any compatible devices in its vicinity when it is shaken or spun.

In a set of embodiments the second device determines information relating to the orientation of the first device. This could be achieved, by example, by measuring the time difference of arrival between signals transmitted from transmitters located at different positions on the first device. This might be useful for the second device to know whether it should perform a particular action depending on whether or not the first device is pointing in the direction of the second device (e.g. whether an axis of the first device is pointing towards the second device, perhaps to within a predetermined angular tolerance).

In a set of preferred embodiments the action performed by the second device comprises receiving data from said first device. The data may be encoded on the acoustic signal or received by another channel (which might or might not be acoustic).

In a set of embodiments the second device performs said action if receipt of the acoustic signal is interrupted. One envisaged application of this function is to allow termination of the transfer of data from the first device to the second device or vice versa if a user places a hand (or other obstruction) between the two devices whilst the transfer is taking place.

So far the examples given of possible applications of the invention have assumed that the acoustic signal is received by the second device directly from the first device. However this is not essential. Indeed in one set of preferred embodiments the acoustic signal is reflected from an input object and said second device determines information about the location or motion of the input object. These embodiments allow an input object, preferably a human hand or part thereof, to be used to control a function of the second device.

The basic principle of using acoustic signals to determine information about the location or motion of an input object such as a human finger is explained in various of the Applicant's previous applications such as WO 2009/147398. The difference here is that a finger tracking or gesture detection or the like can be carried out between two separate devices. There are several reasons why this might be beneficial. It can enable movements of the input object such as gestures or finger tracking, for controlling either or both devices to be executed in a space between them. For example a gesture corresponding to transfer of a digital object might be used to initiate transfer of that object from one device to the other. For this and other embodiments it is preferred that the signal reflected from the input object is also received and processed by the first device. Another advantage of using two devices in determining movement of the input object is that the transmitter and receiver can easily be separated by greater distance than is possible when both are housed in the same device. It may also be easier in the manufacturing process to provide elements which are transmit-only or receive-only, due to their reduced complexity and avoiding the need to provide two different sets of amplification circuits or transmit-receive switching schemes. One advantageous application of this which is envisaged is the provision of several devices, which could be identical, which can be used together to form a tracking and/or gesture recognition system when placed by a user. This might, for example be used to set up a wireless temporary or semi-permanent zone for controlling a device such as a computer of games console.

Also, some or all the computations could be carried out remotely from the sensing units, e.g. on a centralized CPU. This would reduce the manufacturing cost of the sensing devices. For instance, the transmitting and sensing devices could be equipped with analogue-to-digital and digital-to-analogue converters plus a wireless or wire-based link over which acoustic signals are transmitted. The processing and generation of such signals could be carried out on the core CPU. If necessary, the signals could be compressed to reduce the need for bandwidth.

Of course the first device could receive as well as transmit as mentioned above, and/or the second device could transmit as well as receive. Each device may have any number of transmitters and receivers.

The second device could receive the direct path signal as well as the reflected signal. This could allow recognition of the location of one device relative to the other. This could be very useful in the embodiments described in the preceding paragraph whereby two separate devices are used to monitor a movement as some movements may require knowledge of the relative positions of the transmitter and receiver. The direct path signal could be received simultaneously with the reflected one, but preferably the system is arranged so that they are received at different times since the direct path signal is likely to be significantly stronger than the reflection and so could swamp it if they were received at the same time.

In some embodiments in accordance with the invention motion of the first device results in an action occurring in the second device. In those embodiments that is achieved by the second device receiving a signal transmitted from the first device and interpreting that signal to recognise movement. However the Applicant has recognised that the functionality can be achieved in other ways. When viewed from a second aspect therefore the invention provides a method of operating a system comprising first and second handheld devices wherein motion of the first device results in an action occurring in the second device.

This aspect extends to a handheld device configured to perform an action as a result of motion of another handheld device.

As previously, the action could comprise receiving data transferred from the first device (or elsewhere), selecting an option, moving a cursor, triggering an alert or indeed any other action which the second device is capable of carrying out. The movement of the first device could comprise a movement through space, a movement about a centroid, or a combination of the two. Thus some non-limiting examples include translating the first device, shaking it, rotating it etc. These allow the first device to act as an active user interface object for the second. Examples of this are use of the first device as a 'mouse' for the second, triggering an alert in another device when the first is shaken, sending a photo to several other devices by rotating the first, to name just a few.

As discussed in respect of the first aspect of the invention, motion of the first device could be determined by the second device—e.g. using acoustic signals. In another set of embodiments (not necessarily mutually exclusive) motion of the first device could be self-determined. This might be through on-board sensors such as an accelerometer, gyro, tilt switch or the like, through signals sent and reflected from a reference object (which could be the second device), signals received from another reference source (e.g. the second device) or any combination of these.

In some embodiments as well as an action occurring in the second device an action could occur in the first device too. These two actions could be linked—e.g. the transfer of data—or could be separate.

Another set of preferred embodiments of the first aspect of the invention allows data to be transferred from one device to another when the second device detects a gesture carried out by an input object reflecting an acoustic signal transmitted by the first device. However the Applicant has recognised that such a function can be achieved in other ways and thus when viewed from a third aspect the invention provides a method of operating first and second handheld devices comprising the steps of:

said first device using an acoustic signal to determine information regarding the location of said second device relative to the first device;

said first device detecting a movement of an input object corresponding to a predetermined gesture; and said first device transmitting data to said second device depending upon said location information.

This aspect extends to a handheld device configured to:

use an acoustic signal to determine information regarding the location of a second handheld device relative to itself;

detect a movement of an input object corresponding to a predetermined gesture; and transmit data to said second device depending upon said location information.

Thus it will be seen by those skilled in the art that in accordance with this aspect of the invention, one device can transmit data to another device, depending on the location of the second device, in response to a user executing a gesture that is detected by the first device. The gesture might, for example, be a flick or slide. It could be one that is executed on a touch pad or touch screen, one that is executed touchlessly (e.g. as detected by reflections of an ultrasonic signal) or even a combination of both. One example of this would be a gesture comprise a pinch to 'pick up' a data object such as a photo, which gesture could be executed on a touch-screen, followed by a flick or throw to transfer it to the second device.

The location information could comprise a specific point or volume of space relative to the first device or could simply be a given distance and/or direction relative to the first device. In a preferred set of embodiments the location information comprises information regarding the direction of the second device relative to a predefined axis of the first device. Preferably the data is only sent if the predetermined gesture and the location information are compatible. For example the data is only transmitted if the second device is within the particular range of directions. This could be coupled with determining direction information from the gesture—e.g. to transmit the data only if the gesture is made towards the second device, or to select which of a number of devices in the vicinity of the first device is to receive the data. Thus some embodiments comprise a plurality of second devices wherein the gesture determines which of the second devices receive the data. Equally however it could be used, for example, to ensure that data is transferred if the first device is 'pointing' at the second device.

In one set of embodiments the acoustic signal used, at least partially, to determine location is transmitted by the second device. In some embodiments the location information is based on signals transmitted by both devices. For example each device could comprise a transmitter and two receivers. The Applicant has appreciated that simply by one device measuring the time difference of arrival between two different receivers of a signal from the other device, and also the time taken for a signal from the first device to be received by the second device and for a response to be received by the first device (i.e. the round trip time, assuming the delay between receipt and response is known and can be subtracted), the location of one device relative to the other in two dimensions can be reduced to one of two positions on opposite sides of a central axis. If say both devices are known to be at rest on a table, this may be sufficient in some circumstances where say a gesture is used to control the transfer of a file from the first device to the second. Preferably however a separate, preferably electromagnetic, synchronisation signal is sent in order to allow absolute times of flight of the acoustic signals to be calculated. This simplifies the determination of relative locations.

Certain preferred embodiments of the invention will now be described, by way of example only, with reference to the accompanying drawings in which.

Figure 6:
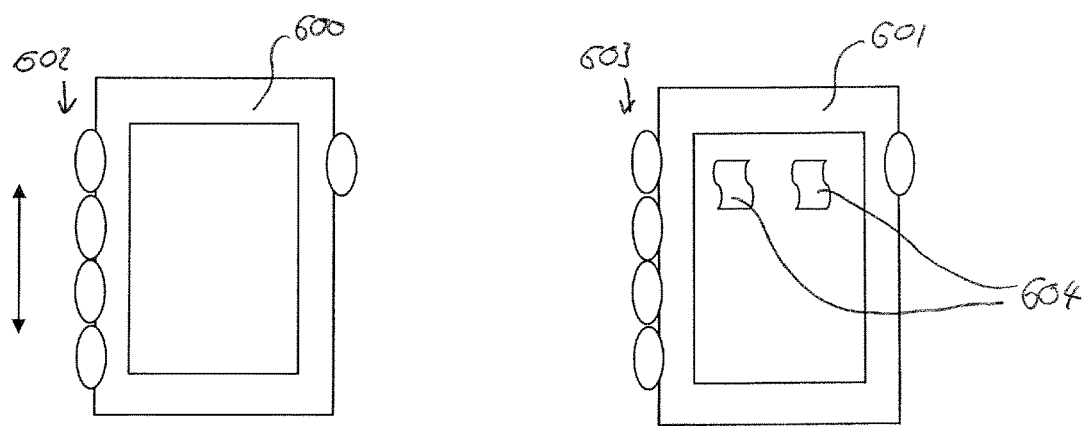
Figure 7:
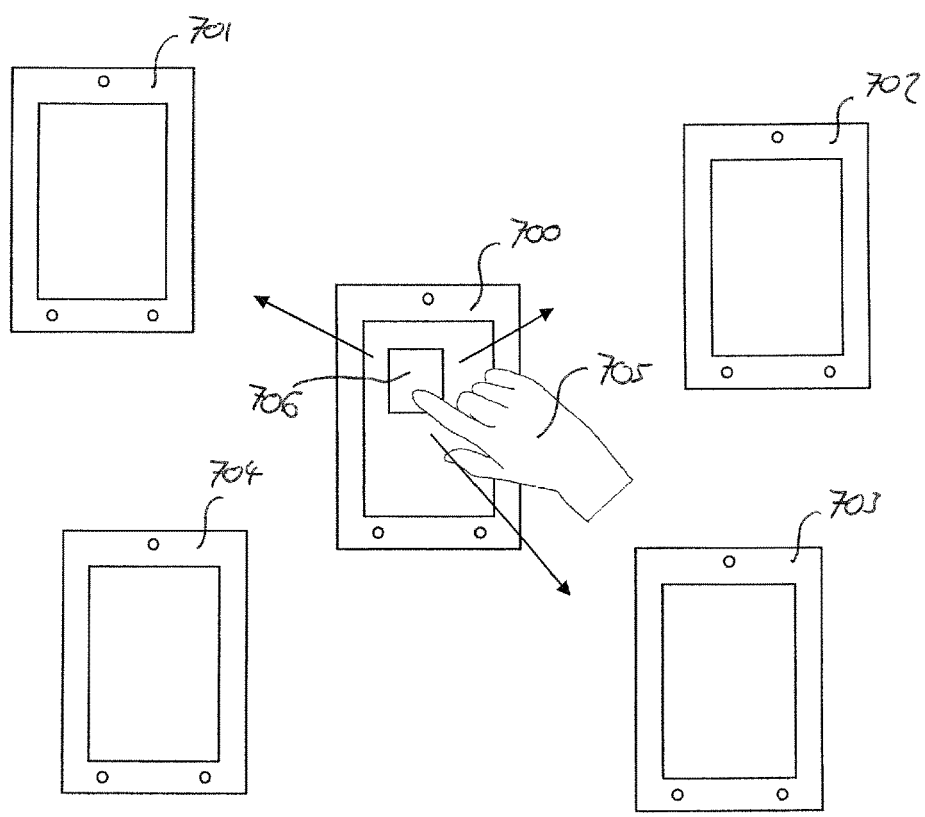

FIG. 6 a schematic view of one device being used to affect another device;

FIG. 7 is a schematic plan view of a user interacting with several devices through gestures.

Figure 1:
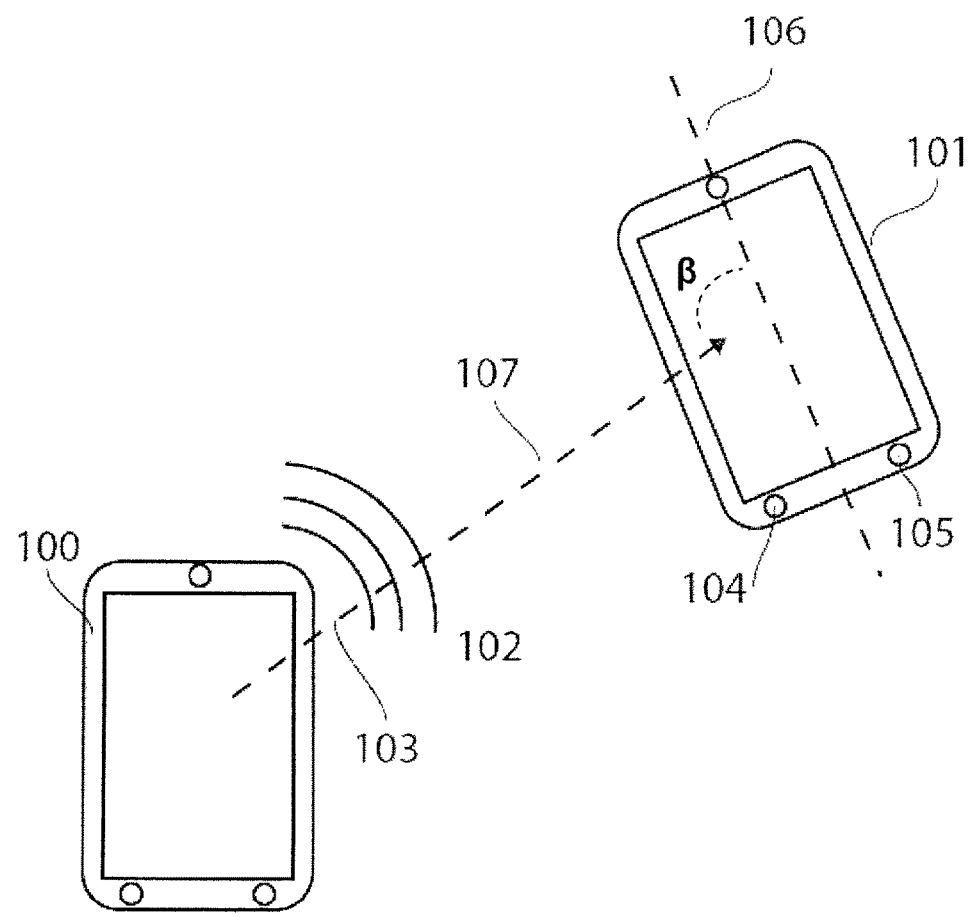
FIG. 1 is an illustration showing how each of two mobile devices can determine the position of the other.

Referring first to FIG. 1 it will be described how, in accordance with the invention, two mobile devices 100 and 101 can determined each other's position in a plane, and how these positions can be used for gestures involving more than one device.

A first device 100 and a second, similar device 101 lie flat on their backs on a surface, such as a table top. Prior to any gesture conducted between the two devices, the first device 100 emits an ultrasonic pulse signal 102 from an ultrasonic transmitter 103 and, simultaneously, a radio-signal from a radio-transmitter (not shown). Alternatively, the radio-signal could be replaced by another, instantaneous (i.e. speed-of-light) signal, such as an infrared signal or a wired connection. This allows the two devices 100, 101 to be synchronised so that one can time the travel of acoustic signals sent from the other.

The 'sync' could also or instead be established using a synchronized clock between the two devices, so that the timestamp of one clock could be used as a reference timing point, communicated to the other device at a later point in time, via a suitable link, i.e. a radio-link, a wired link, an infrared link or an ultrasonic link.

The ultrasonic pulses are received by the receivers 104 and 105 of the second device 101. These could be positioned on top of the device or on any of the sides. It is not necessary that the emitted sound is ultrasonic. It could also by hypersonic, or sonic. In some situations an audible 'ping' sound or a chirp sound could be acceptable to the user even though it is not inaudible.

The use of a sync-signal allows the second device 101 to record two time-of-flight values using an ultrasonic signal detector, connected to the receivers 104, 105, and a radio-signal detector. Without the sync-signal, only time-differences of arrival between the two receivers 104, 105 would be possible to estimate.

Of course, detection need not necessarily happen before gestures starts: position detection could be part of an ongoing, iterative process, constantly updating positions continuously, continually, or at regular intervals.

Pulse-compression, coding or inversion techniques could be used, instead of transmissions in pulse-mode. They could be applied both on the ultrasonic link and the radio-link to obtain a similar positioning effect but with higher effective signal-to-noise ratio. From these two time-of-flight (TOF) measurements measured by the two respective receivers 104, 105 the second device 101 can decide the position of the first device 100 up to an ambiguity of a reflection around the zero axis, within the plane of the surface on which they lie.

Next, the second device 101 emits an ultrasonic pulse and a radio-pulse (neither shown), allowing the first device 100 to record two other TOFs. If the two devices can communicate with one another over a radio-link (or an infrared link or an ultrasonic link or a wired link), they jointly have four TOF-measurements available. The relative position of one device relative to the other in the plane has two degrees of freedom (x,y) as defined by the vector 103, and an angle β around this vector, being the angle between the vector 107 and the centre-line vector 106 of the second device 101. In total, the two devices have four observations which are sufficient to calculate these three degrees of freedom. Hence, subsequently, one or both of the devices 100, 101 compute the position of the other device; if necessary, by sharing information about the time-of-flight values. Note that if only the relative position and not the relative orientation of the second device 101 relative to the first 100 is necessary, fewer parameters have to be estimated and less information and communication of measurements is needed.

In all of the above, it is presupposed that the devices lie in a common plane, i.e. on a table or on a similar surface of similar height. The static placement of these devices on a table can be detected either using a gyro, or simply by measuring the ultrasonic, partly reflective signal sufficiently frequently; if the signal is constant or substantially constant over time, it is likely to be a result of the devices lying on a table, since the received signals are likely to change if the devices are in relative motion or are in a changing environment, such as inside a handbag. These two sources of information can be used at the same time. Also, a command entered on the devices, such as a key press or a menu-selection can be used by an operator to indicate that a device is in a 'ready' state. Touch-sensors embedded in the frame of the devices could also be used to detect a 'ready' or 'table-rest state'. Other sources of information about the device's surrounding, such as use of a built-in camera, may be utilised.

The devices could also be configured to recognize each other's position (e.g. relative location and/or orientation) in three-dimensional space. To do so, more measurements need to be taken, as more degrees of freedom need to be computed.

Next, once the relative positions and/or orientation of the devices are known, a performed gesture can be interpreted by the CPU of one or other device, or by a specific software application, "contextually" with respect to the positions of one or both devices 100,101 or their relative relationships.

Figure 2:
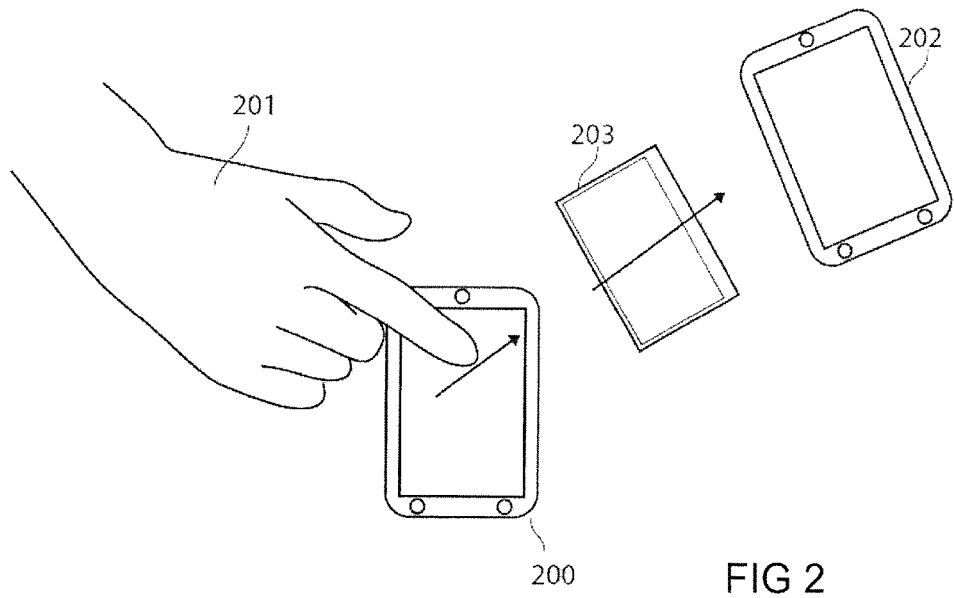
FIG. 2 is a schematic illustration of the use of an embodiment of the invention to transfer data between two mobile devices.

For example, in FIG. 2, a user's finger 201 is moving above a device 200 in a fashion so as to indicate that an on-screen displayed photo 203 (the binary data being figuratively represented as an actual image in FIG. 2); is to be sent to another device 202 by a data communication link.

The gesture can be conducted on or above the surface of the first device 200, i.e. a surface touch-screen gesture, or a touchless gesture; or alternatively, a movement of the device itself could be taken as a gesture, such as a directional movement of the first device 200 towards the second device 202, or by setting the first device 201 spinning on the table top about its centre of mass e.g. to indicate that a picture should be shared with all the other devices in its vicinity.

In another example, the gesture can be made contextually with respect to the distance to the other device 202, independently of the direction to the other device 202; i.e. with respect to a radius. If the radius is sufficiently large, i.e. the other device too far away, either a software application involved in sending the information or one involved in receiving it could abandon the transmission.

Figure 3:
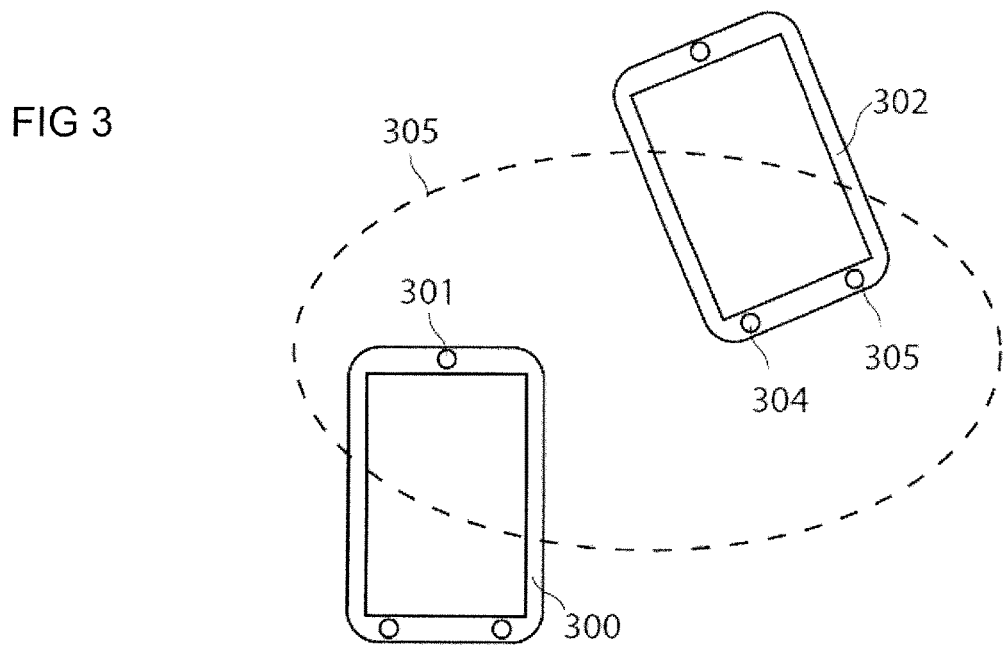
FIG. 3 is an illustration of a further function embodying the invention.

FIG. 3 shows an example where two devices 301, 302 not only detect gestures by themselves' (independently of any other device; e.g. by processing reflections of acoustic signals transmitted by the same device that receives the reflections), but also 'between themselves'. Preferably, each device knows the position of the other device. The transmitter 301 of the first device 300 emits ultrasonic signals which are received by the receivers 304 and 305 of the second device 302. The transmitter 301 and the receivers 304 and 305 can form a 'collaborative sensing space' 305 between the two devices. The act of a user inserting his hand into this space could be taken as a gesture in itself; it could, for example, represent a command to block data transmission between the two devices, or to start data transmission between them. Finer movements between the two devices, e.g. using fingers, hands or other objects, or even using actively-transmitting objects, could be used to further enrich the number and type of gestures that can be recognised. For example, circling the fingers while moving the hand linearly from the vicinity of one device towards the other could initiate the transfer of all file of a particular type, e.g. music files, from one device to the other.

The two devices preferably have a communication link (e.g. a radio link) between them in order to operate the collaborative sensing space in an optimal manner; for example, by sharing information concerning the acoustic signals, such as their acoustic frequency and timing patterns. However, this is not always strictly necessary, as the receiving device 302 can 'learn' the transmission rates and also positions of the first device 300. Hence, the first device 300 could take the role of the 'naïve transmitter', ignorant of the capabilities or possibly even the presence of the second device 302, while the second device 302 acts as a 'clever receiver'.

Complex sensing fields could be constructed between two or more devices by sharing access to the various transmitters and receivers of the devices. These fields could be much wider and more complex than the ones allowed by one device alone, or more devices operating on their own.

Some more detail on how to compute the position of one device relative to the other now follows, with particular reference to FIG. 3.

Let the positions of the transmitter 301 and the two receiving elements of the first device 300 be denoted as vectors x1, x2 and x3 respectively from an arbitrary origin. Furthermore, the positions of the transmitter and the receivers 304, 305 on the second device 302 are denoted y1, y2 and y3. Without loss of generality, we can assume that x1, x2 and x3 are fixed, i.e. constant. This is because, for operating the first device 300, it is typically sufficient to know the relative position and orientation of the second device 302.

What is observed using the ultrasonic signal and the sync signal are the times-of flight from the transmitting point x1 to the two receiving point y2 and y3, and from the transmitting point y1 to the receiving points x1 and x2. These time-of-flight distances are represented by the four equations, $$\|x_1-y_2\|=d_1$$

$$\|x_1-y_3\|=d_2$$

$$\|y_1-x_2\|=d_3$$

$$\|y_1=x_3\|=d_4$$

The distances between the elements y1, y2 and y3 are known; these distances effectively decide the 'geometry' of the point constellation (y1, y2, y3) up to an arbitrary rotation and a common offset. These equations are then $$\|y_1-y_2\|=f_1$$

$$\|y_1-y_3\|=f_2$$

$$\|y_2-y_3\|=f_3$$

The letter 'f' is used to indicate that these distances are fixed, in contrast to the measured TOF distances d1, . . . d4.

Each of the seven equations above defines a circle in two-dimensional space. There are three positions to measure, y1, y2 and y3, each having two coordinates, giving a total of 6 degrees of freedom. With seven equations, these 6 parameters can easily be estimated by circle intersection algorithms. To take one non-limiting example, each of the equations could be squared, the right side subtracted from the left and further squared, and the sum of all these expression minimized using a gradient descend algorithm. Three-dimensional equivalents to these equations could be derived similarly if more observations are available; e.g. by equipping each device with more than two receivers, or a second transmitter. With the position of the points (y1, y2, y3) known, other information such as the distance and direction to a central point on the second device 302 from a central point on the first device 301, or the orientation of the second device 302 relative to the first device 301 can be worked out in a straightforward manner.

Other suitable algorithms for determining circle intersections are available in the literature, such as those in "Intersection Algorithms for Lines and Circles", by A. E. Middletitch, T. W. Stacey and S. B. Tor, ACM Transactions on Graphics, Volume 8, Issue 1, January 1989, pp. 25-40.

A further embodiment of the invention is described with reference to FIG. 4.

Figure 4:
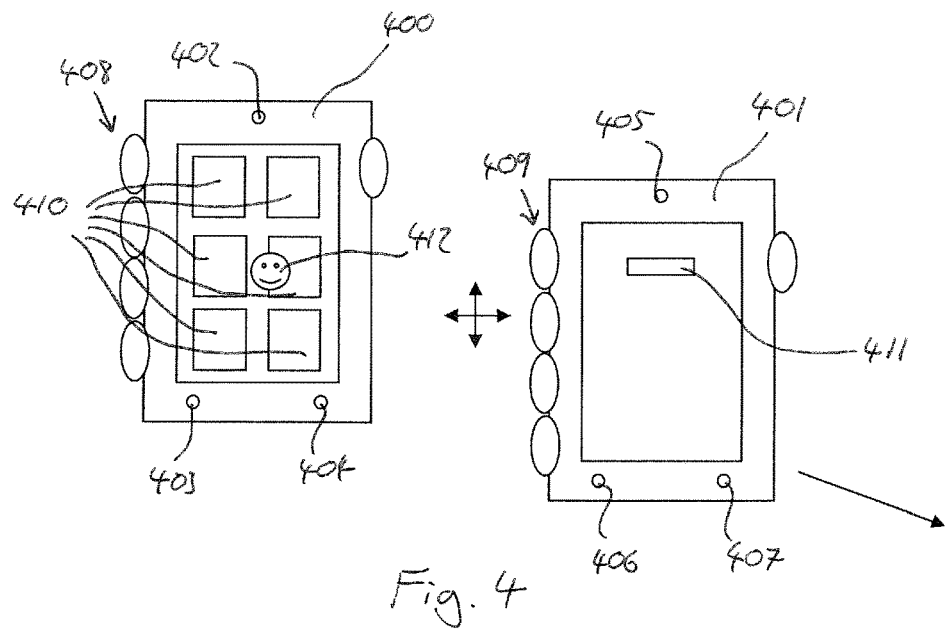
FIG. 4 is a schematic view illustrating an interaction between two devices.

FIG. 4 shows a first handheld device 400 and a similar second handheld device 401, each equipped with an ultrasonic transmitter 402; 405 and two ultrasonic receivers 403, 404; 406, 407, spaced around the perimeter of the top face of the device.

The first device 400 is being gripped in the right hand 408 of a first user, while the second device 401 is held in the right hand 409 of a second user.

The first device 400 is displaying six icons 410 representing picture files, such as photographs, stored in the memory of the device. A cursor 412 is movable over the icons, controlled by movement of the second device 401 relative to the first device 400.

The devices may lie in a plane, such as on the surface of a table, in which case movement of the second device within the plane causes movement of the cursor 412 in much the same way as a conventional mouse can be used to control an on-screen cursor on a desktop computer, or one or both devices may be held in space, so that relative movement of the second device 401 in three-dimensions controls the cursor 412.

Unlike a mouse, the second device 401 does not determine information about its position relative to a static object such as a desk and does not transmit such information to the first device 400. Rather, the first device 400 periodically calculates information about the instantaneous position of the second device 401 relative to itself (i.e. the distance and bearing to the second device 400). It does this using absolute time-of-flight values or time-difference-of-arrival values measured by both devices using acoustic signals transmitted by the other device. The second device 401 sends its measurements, or information derived therefrom, to the first device 400 (e.g. over a radio link), in order that the first device 400 may calculate the necessary position information. Suitable mathematical calculations have been described above.

When the devices are movable in three dimensions, a virtual plane may be established, containing the display surface of the first device 400, with movements of the second device 401 in directions parallel to this plane controlling the cursor 412 and any movements orthogonal to the plane being ignored. Alternatively sufficient transducers could be provided to allow full three-dimensional movement tracking—e.g. to allow a zoom level or other function to be controlled with movement in the third dimension.

A button 411, which may be a GUI element or a physical button, may be provided on the second device 401 to activate remote control of the cursor 412. The cursor 412 may be an icon particular to the second device 401, such as a logo or small photograph, so that the users of both devices can visually determine who is controlling the cursor 412.

The cursor's position may be updated at any suitable rate, but in one example a rate of 30 Hz is used. This will require acoustic signals to be transmitted from each device at a suitable rate. The respective transmitters 402, 405 may transmit on the same frequency, but separated in time, or may transmit substantially simultaneously, but using a different frequency or coding to prevent interference. Since only direct flight paths are measured, the first and/or strongest signal at each receiver may be used to determine the arrival time, since any reflections off other objects will arrive later and will typically be considerably weaker.

The user of the second device 401 may select a picture on the first device 400 to be transferred to the second device 401 by activating the remote cursor control mechanism. He then moves the cursor 412 to lie over a desired icon 410 by moving his device 401 appropriately, while watching the display of the first device 400. Once the cursor 412 is in place, a select action is performed on the second device 401. In one embodiment, this is a rapid linear acceleration of the second device 401 away from the first device 400, as shown figuratively by an arrow in FIG. 4. So as to avoid confusion between this action and the cursor-control movements, any relative or absolute acceleration and/or velocity of the second device 401 may need to be below a threshold to be registered as a cursor control action, while motions that exceed the threshold are reserved for other actions, such as a select action. This select action may be detected using the ultrasonic relative positioning mechanism, or may be determined separately, for example, by using an accelerometer built into the second device 401.

Once a picture is selected, the first device 400 may send it to the second device 401 using any suitable communications link. An ultrasound link could be used, but for speed it is preferred to use an electromagnetic channel.

A further embodiment is described below with reference to FIG. 5.

Figure 5:
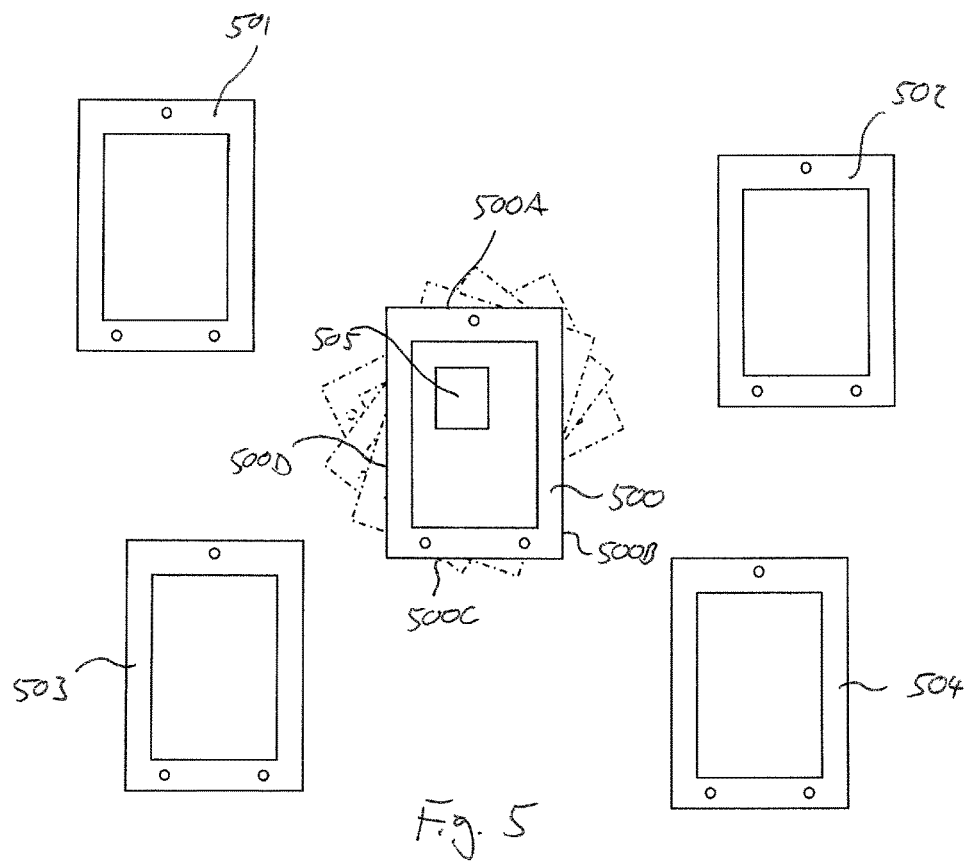
FIG. 5 is a schematic plan view showing one device interacting with several other devices.

FIG. 5 shows a handheld device 500, such as a smartphone, lying on a surface, such as a desk. Four further handheld devices 501, 502, 503, 504 lie around it on the same surface. All the devices are lying on their backs, although this is not essential. The devices 500-504 need not all be of the same make and model as each other, so long as they are all configured to run compatible protocols. The surrounding devices 501-504 may be very close to the central device 500, e.g. a few centimeters away, or may be distributed more widely, e.g. one or two meters away, as may be the case when the common surface is that of a conference table, for example.

The central device 500 and surrounding devices 501-504 use their ultrasound transducers to enable the central device 500 to determine the identity of those surrounding devices 501-504 which are within a predetermined range (which may be configurable by the user) of the central device 500. This can be accomplished by methods explained previously. The bearing of each surrounding device 501-504 is not important for this application, so need not be determined, or may be ignored if known.

A user of the central device 500, wishing to distribute a data object, such as a document, to all the devices 501-504 of other people at the table, selects an icon 505 representing the data object and then spins the device 500 approximately about its centre of mass (which action is represented figuratively by the dashed outlines in FIG. 5).

The central device 500 comprises means for detecting such a spinning action. For example, this may comprise four micro electro-mechanical systems (MEMS) linear accelerometers located respectively near a top edge 500A, right edge 500B, bottom edge 500C and left edge 500D of the device and arranged to detect accelerations radially from the centre of mass of the device 500, which occur at all four edges when the device spins. In an alternative example, the device 500 may comprise a MEMS angular accelerometer or gyroscope, arranged to detect the spinning. When the central device 500 detects that it is spinning above a predetermined rate, it initiates a data transfer operation to the identified surrounding device 501-504, to send the selected data object to them, for example using an 802.11 wireless link. Of course, other actions are possible on detecting the spinning. For example, the data object may reside on a remote server, and the central device 500 instructs the server to send the object to the surrounding devices 501-504; or the surrounding devices 501-504 may already have the data object stored in their memories, and the central device 500 merely instructs them to activate or display it.

A further embodiment will be described with reference to FIG. 6.

FIG. 6 shows two mobile phones (cell phones) 600, 601. These may be equipped with ultrasonic transducers to enable functions described previously, but this is not required. The first mobile phone 600 is able to communicate control messages to the second mobile phone 601; this may be via a local link, such as infrared transducers or over a wireless local-area network, or via a telephone network base station, for example using the SMS protocol. Software to enable such cross-device interaction may be provided with the mobile phones 600, 601 from new, or may have been downloaded from a service provider by the users.

The first mobile phone 600 contains within it means for detecting a linear shaking action, represented figuratively by a double-headed arrow in FIG. 6. The first phone 600 may therefore comprise, for example, one or more MEMS linear accelerometers and suitable control hardware and software.

If a first user 602 holding the first mobile phone 600 wishes to give an indication to a second user 603 holding the second mobile phone 601 in order to attract his or her attention, indicate the first user activates a cross-device interaction feature using a menu selection or button (not shown), and then shakes the mobile phone 600 as indicated by the arrow. The first phone 600 detects this shaking motion and sends a control command to the second phone 601. The second phone 601 reacts to this command by alerting the user, for example by an audible signal, or by visually distorting graphical content 604 on the screen.

Interaction by physical movements of the first mobile phone 600 can be more intuitive and natural than invoking a similar function via a GUI selection.

A final embodiment is described with reference to FIG. 7.

FIG. 7 shows a central handheld device 700, such as a smart phone, lying on a table top. Four further device 701-704 lie on the table in the vicinity. Each device is equipped with ultrasonic positioning hardware and software as previously described, thereby allowing the central device 700 to determine the identities and bearings to the surrounding devices 701-704. The central device 700 may also determine distances to these devices, but this is not essential.

When a user 705 wishes to distribute a document, such as a digital business card, represented by an icon 706 on the screen of the central device 700 to some, but not all, of the surrounding devices, he successively conducts directional gestures with his fingertip. moving from the icon 706 towards each of the desired devices 701, 702, 703, then back to the icon, in turn, simulating "flicking" the data from the central device 700 to selected other devices. (This can be contrasted with the scenario described previously with reference to FIG. 5).

The central device 700 can use its standalone ultrasound tracking capabilities to characterise the motion of the user's fingertip and to determine whether it is within an angular range (say, within plus or minus 10 degrees) of the previously-determined relative bearing of one of the identified surrounding devices 701-704. If so, the business card data is transmitted to that device, either immediately, or once all the gesture inputs have been completed.

For greater accuracy, instead of the central device 700 characterising the motion of the user's fingertip only by transmitting ultrasound signals from its own transmitter and listening to reflections received at its own receivers, the central device 700 may collaborate with at least some of the surrounding devices 701-704 in order that one or more of these devices receives and processes reflections arising from signals transmitted by a different one of the devices. By increasing both the number of transmitter-receivers channels and also the separation distance between the transmitters and receivers of at least some of the channels, much greater accuracy in determining the motion of the fingertip can be realised. For example, the motion of the fingertip could be accurately tracked all the way from the central device 700 to a position above each of the selected surrounding devices 701-703, rather than relying on the "trajectory" of a flick near the central device 700. In this way, the spurious detection of movements which were not intended to be user inputs can be reduced.

The invention claimed is:

1. A system comprising first and second handheld devices, a method of operating a touchless interaction user interface on the second device, the method comprising:
the first device transmitting an acoustic signal, the acoustic signal being reflected from an input object producing a reflection, wherein the input object is a hand or a part of a hand;
the second device receiving the reflected acoustic signal from the input object;
the second device determining information about the motion of the input object based on the received reflected acoustic signal;
the second device using the information about the motion of the object to detect a gesture performed by the input object;
the second device using said gesture to determine an input to said touchless interaction user interface; and the second device using said input to control a function of said second device;
the method further comprising the first device determining the position of the second device; and the second device determining the position of the first device.

2. The method of claim 1, further comprising the second device alerting a user of the second device to the presence of a user of the first device in the vicinity.

3. The method of claim 1, further comprising the second device plotting the position or proximity or movement of the user of the first device on a display of the second device.

4. The method of claim 1, further comprising the second device determining the distance between the first and second devices.

5. The method of claim 4, further comprising determining whether to activate a function involving the two devices depending on whether the distance between the devices satisfies a proximity threshold.

6. The method of claim 4, further comprising the first device transmitting an electromagnetic signal to the second device.

7. The method of claim 4, further comprising measuring the time of flight of the acoustic signal between the first and second devices.

8. The method of claim 1, further comprising the second device determining whether the first device is in a predetermined angular range.

9. The method of claim 1, further comprising the second device determining location information relating to the first device from the received reflected acoustic signal.

10. The method of claim 1, further comprising the second device receiving the received reflected acoustic signal via a plurality of receivers.

11. The method of claim 1, further comprising the first device transmitting acoustic signals via a plurality of transmitters.

12. The method of claim 1, further comprising the first device being shaken or spun, and the second device determining information about the shaking or spinning motion of the first device.

13. The method of claim 1, further comprising the second device determining information relating to the orientation of the first device.

14. The method of claim 13, further comprising the second device determining whether to perform an action depending on whether the first device is pointing in the direction of the second device.

15. The method of claim 1, further comprising the second device receiving data from the first device.

16. The method of claim 15, wherein the data are encoded on the acoustic signal.

17. The method of claim 1, further comprising the second device performing an action if receipt of the acoustic signal by the second device is interrupted.

18. The method of claim 1, further comprising the first device receiving and processing a reflection of the transmitted signal from the input object.

19. The method of claim 1, further comprising the second device receiving, at a different time to the reflected acoustic signal, an acoustic signal from the first device along a direct path and using the direct-path signal to determine the relative location of the first device.

20. The method of claim 1, further comprising transferring data from one device to the other in response to a gesture carried out by the input object.

21. The method of claim 1, further comprising carrying out at least some processing of the signals remotely from the handheld devices.

22. The method of claim 1 further comprising:
the second device determining information about the location and motion of the input object based on the received reflected acoustic signal.

23. A handheld device comprising a touchless interaction user interface and configured to:
receive a reflected acoustic signal from an input object, wherein the input object is a hand or a part of a hand, the reflected acoustic signal being a reflection from the input object of an acoustic signal transmitted by another handheld device;
determine information about the motion of the input object based on the received reflected acoustic signal;
use the information about that motion of the object to detect a gesture performed by the input object;
use said gesture to determine an input to said touchless interaction user interface; and
use said input to control a function of said handheld device,
wherein the handheld device is further configured to determine the position of the other handheld device and the other handheld device is configured to determine the position of the handheld device.

24. The handheld device of claim 23, wherein the device is configured to alert a user of the device to the presence of a user of the other device in the vicinity.

25. The handheld device of claim 23, wherein the device is a laptop computer and the other handheld device is a mobile device, and wherein the laptop computer is configured to use the information about the location or motion of the mobile device to determine mouse or remote-control inputs from the mobile device.

26. The handheld device of claim 23, wherein the device is configured to plot the position or proximity or movement of the user of the other device on a display of the device.

27. The handheld device of claim 23, wherein the device is configured to determine the distance between it and the other device.

28. The handheld device of claim 27, wherein the device is configured to determine whether to activate a function involving it and the other device, depending on whether the distance between the devices satisfies a proximity threshold.

29. The handheld device of claim 27, the device comprising a receiver for receiving an electromagnetic signal from the other device.

30. The device of claim 27, wherein the device is configured to measure the time of flight of the acoustic signal from the other device.

31. The handheld device of claim 23, wherein the device is configured to determine whether the other device is in a predetermined angular range.

32. The handheld device of claim 23, wherein the device is configured to determine location information relating to the other device from the received reflected acoustic signal.

33. The handheld device of claim 23, the device comprising a plurality of receivers.

34. The handheld device of claim 23, the device being configured to determine information about a shaking or spinning motion of the other device.

35. The handheld device of claim 23, the device being configured to determine information relating to the orientation of the other device.

36. The handheld device of claim 35, the device being configured to determine whether to perform an action depending on whether the other device is pointing in the direction of the device.

37. The handheld device of claim 23, the device being configured to receive data from the other device.

38. The handheld device of claim 37, the device being configured to receive the data encoded on an acoustic signal.

39. The handheld device of claim 23, the device being configured to perform the action if receipt of the acoustic signal by the device is interrupted.

40. The handheld device of claim 23, the device being configured to transmit or receive data in response to a gesture carried out by the input object.

41. The handheld device of claim 23, wherein the device is further configured to determine information about the location and motion of the input object based on the received acoustic signal.

* * * * *